(12) United States Patent
Raju

(10) Patent No.: US 8,892,629 B2
(45) Date of Patent: Nov. 18, 2014

(54) SYSTEM AND METHOD FOR DISPLAYING A VIRTUAL MEETING ROOM

(75) Inventor: Venkatesh Raju, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 2180 days.

(21) Appl. No.: 11/390,509

(22) Filed: Mar. 27, 2006

(65) Prior Publication Data

US 2007/0050452 A1     Mar. 1, 2007

Related U.S. Application Data

(60) Provisional application No. 60/713,501, filed on Sep. 1, 2005.

(51) Int. Cl.
| | |
|---|---|
| G06F 15/16 | (2006.01) |
| H04L 29/08 | (2006.01) |
| H04L 12/18 | (2006.01) |
| H04N 7/173 | (2011.01) |
| H04N 21/4223 | (2011.01) |
| H04N 21/4788 | (2011.01) |
| H04L 29/06 | (2006.01) |

(52) U.S. Cl.
CPC ............ *H04L 67/16* (2013.01); *H04L 12/1813* (2013.01); *H04N 7/17318* (2013.01); *H04N 21/4223* (2013.01); *H04N 21/4788* (2013.01); *H04L 67/36* (2013.01); *H04L 67/38* (2013.01)
USPC ....................................................... 709/203

(58) Field of Classification Search
CPC .................. H04N 7/15–7/157; H04L 12/1813; H04L 51/04; H04L 51/06
USPC ........... 709/203; 715/753, 756–759, 781, 810
See application file for complete search history.

(56) References Cited

U.S. PATENT DOCUMENTS

| | | | | |
|---|---|---|---|---|
| 6,772,195 | B1 * | 8/2004 | Hatlelid et al. | 709/204 |
| 6,807,562 | B1 * | 10/2004 | Pennock et al. | 709/204 |
| 7,185,054 | B1 * | 2/2007 | Ludwig et al. | 709/204 |
| 7,257,618 | B2 * | 8/2007 | Danker et al. | 709/206 |
| 7,325,196 | B1 * | 1/2008 | Covington et al. | 715/251 |
| 7,404,001 | B2 * | 7/2008 | Campbell et al. | 709/231 |
| 8,589,485 | B2 * | 11/2013 | Uchide | 709/204 |
| 2002/0075306 | A1 * | 6/2002 | Thompson et al. | 345/753 |
| 2002/0097267 | A1 * | 7/2002 | Dinan et al. | 345/757 |
| 2002/0129106 | A1 * | 9/2002 | Gutfreund | 709/205 |
| 2002/0130904 | A1 * | 9/2002 | Becker et al. | 345/753 |
| 2002/0154210 | A1 * | 10/2002 | Ludwig et al. | 348/14.08 |
| 2003/0233265 | A1 * | 12/2003 | Lee et al. | 705/8 |

(Continued)

OTHER PUBLICATIONS

Perkins, Deborah et al. "Meeting Center 7 Foundations 1: Presenting Online". Oct. 30, 2004. pp. i-66 (1-78).*

*Primary Examiner* — Imad Hussain

(57) ABSTRACT

A system is provided that includes a plurality of electronic devices, a network and a server. The plurality of electronic devices each having a graphic user interface (GUI). The network is in communication with the plurality of electronic devices. The server is in communication with the network. The server is operable to execute an online lobby application and promote presentation of the online lobby or virtual meeting room to the plurality of GUIs of the electronic devices. The online lobby or virtual meeting room displays a first activity area that is selectively replaceable with a second activity area supported by the online lobby.

23 Claims, 5 Drawing Sheets

(56) References Cited

U.S. PATENT DOCUMENTS

| | | | |
|---|---|---|---|
| 2004/0239754 A1* | 12/2004 | Shachar et al. | 348/14.08 |
| 2004/0252185 A1* | 12/2004 | Vernon et al. | 348/14.08 |
| 2005/0071440 A1* | 3/2005 | Jones et al. | 709/218 |
| 2005/0181878 A1* | 8/2005 | Danieli et al. | 463/42 |
| 2005/0275715 A1* | 12/2005 | Shingu et al. | 348/14.07 |
| 2006/0132595 A1* | 6/2006 | Kenoyer et al. | 348/14.08 |
| 2007/0063999 A1* | 3/2007 | Park | 345/419 |
| 2007/0186002 A1* | 8/2007 | Campbell et al. | 709/231 |

* cited by examiner

SYSTEM AND METHOD FOR DISPLAYING A VIRTUAL MEETING ROOM

CROSS-REFERENCE TO RELATED APPLICATIONS

This application claims priority to the provisional application, U.S. Pat. App. No. 60/713,501, entitled "Online Multipurpose Lobby for Interactive Multimedia Activities", filed on Sep. 1, 2005, by Venkatesh Raju. The above-referenced provisional application is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communications, and more particularly, but not by way of limitation, to a system and method of providing a multi-user online lobby.

BACKGROUND OF THE INVENTION

An online lobby is a virtual meeting room where its users gather to engage in online activities such as gaming sessions and text-based chat sessions. In online gaming, a lobby is created in preparation for a gaming session. The creator of the lobby may designate the lobby as public or private. If the lobby is private only certain gamers are notified and can participate in the gaming session. If the lobby is public, garners can be notified by publishing the lobby name in a directory of active lobbies. Gamers are able to participate in a game by entering an active lobby. In some cases, gaming lobbies are short lived and cease to exist once a gaming session starts. When a gaming session ends, a gaming lobby may be automatically recreated and activated in preparation for a new gaming session.

In text-based chatting, a lobby is combined with a chat function such that users can initiate text chatting as soon as they enter the lobby. In many cases, Internet chat lobbies support text chatting but not other online activities.

SUMMARY OF THE INVENTION

In one embodiment, a system is provided that includes a plurality of electronic devices, a network, and a server. The plurality of electronic devices each having a graphic user interface (GUI). The network is in communication with the plurality of electronic devices. The server is in communication with the network. The server is operable to execute an online lobby application and promote presentation of the online lobby to the plurality of GUIs of the electronic devices. The online lobby displays a first activity area that is selectively replaceable with a second activity area supported by the online lobby.

In at least some embodiments, a method comprises displaying an online lobby having a first activity area. The method further comprises selecting another activity by participants in the online lobby. If needed, the method replaces the first activity area with a second activity area that is different from the first activity area.

In at least some embodiments, a storage medium is provided. The storage medium stores computer-readable instructions that, when executed, cause a computer to initiate online lobbies in response to requests from electronic devices. The computer-readable instructions, when executed, further cause the computer to organize a directory of online lobbies. The computer-readable instructions, when executed, further cause the computer to communicate with the electronic devices to display, for each online lobby, a first activity area that, upon request, is replaced by a second activity area different from the first activity area.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Figure 1:
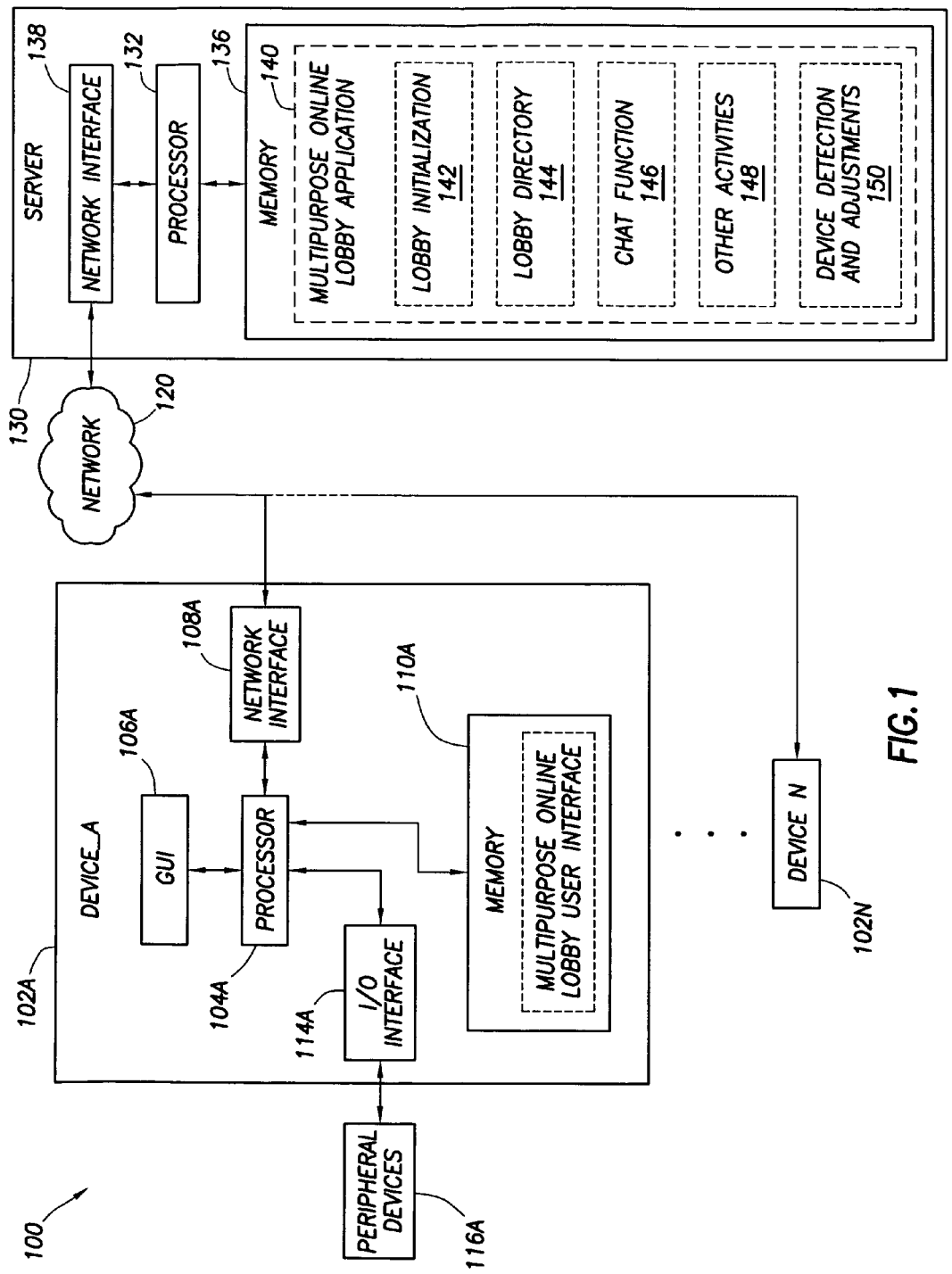
FIG. 1 illustrates a system in accordance with embodiments of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical, wireless, electrical, or mechanical connection. Thus, if a first device couples to a second device, that connection may be through a direct electrical connection, through an indirect electrical connection via other devices and connections, through an optical electrical connection, or through a wireless electrical connection.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure provide a multipurpose online lobby system. The multipurpose online lobby system enables users to communicate interactively in an online environment that can support various activities such as text chatting, audio/video conferencing, photo sharing, audio sharing, video sharing, desktop/screen sharing, application sharing, multiplayer gaming or other activities. The online environment of interactive communication enabled by the multipurpose online lobby system may be referred to as a multipurpose online lobby, an online lobby, or a lobby. In an embodiment, the multipurpose online lobby system may be implemented by a multipurpose online lobby application executing on a server computer and by a plurality of multipurpose online lobby clients executing on the communication devices, one multipurpose online lobby client per communication device. The online lobby client may be a client application operable to promote access to or use of the online lobby system by the communications device. The multipurpose online lobby application executing on the server may be referred to as a multipurpose online lobby application, an online lobby application, or a lobby application. The multipurpose online lobby client executing on the communication devices may be referred to as a multipurpose online lobby client, an online lobby client, or a lobby client. In some cases, the graphical user interface (GUI) through which the user effects interactive communication may be referred to as the multipurpose online lobby, the online lobby, or the lobby. One skilled in the art will appreciate the overlap that may occur with some of the terms used herein, and the disclosure will read more naturally if some latitude is employed in use of these terms.

In at least some embodiments, the multipurpose online lobby system supports simultaneous interactive communication among devices of different types and capabilities. For example, mobile users may communicate interactively via the multipurpose online lobby system using cellular phones that support audio and text only or using "smart" phones that support still image and video capabilities. Meanwhile, users at home, in an office, or elsewhere may communicate interactively via the multipurpose online lobby system using a laptop computer, a desktop computer, or a multimedia (entertainment center) device. These home or office devices can support different peripheral devices that provide input/output to enrich the quality of the communication interactions using the multipurpose online lobby system. Examples of such peripheral devices include, but are not limited to, speakers, monitors, high definition TVs (HDTVs), microphones, video cameras or "web cams", gaming controllers, scanners, and printers. If needed, a first activity area displayed by the multipurpose online lobby, for example in a GUI on the communication device's display, can be replaced by a second activity area that is different from the first activity area. In such case, certain behavioral features or functions of the multipurpose online lobby system do not change and the interactive communication is continuously maintained.

FIG. 1 illustrates a system 100 in accordance with one or more embodiments of the disclosure. As shown in FIG. 1, the system 100 comprises a plurality of electronic devices 102A-102N that couple to a server 130 via a network 120. The electronic devices 102A-102N may comprise handheld mobile devices such as cellular phones, smart phones, personal digital assistants (PDAs) or other mobile devices. Additionally or alternatively, the electronic devices 102A-102N may comprise laptop computers, desktop computers, or multimedia devices located in a home, office or other location. The electronic devices 102A-102N couple to the network 120 via a wired or wireless connection to access a multipurpose online lobby application provided by the server 130.

In FIG. 1, the electronic devices 102A-102N are shown as block diagrams with electronic device 102A being shown in greater detail. The discussion describing the components and functionality of the electronic device 102A can apply, but does not necessarily apply, to all of the electronic devices 102B-102N. As previously mentioned, the electronic devices 102A-102N may comprise any of a variety of different electronic devices (e.g., cellular phones, PDAs, laptops, desktops) having different capabilities. Accordingly, one of ordinary skill in the art would recognize that the performance, the configuration, and the functions of the electronic devices 102A-102N may vary.

As shown, the electronic device 102A comprises a processor 104A coupled to a network interface 108A. The network interface 108A enables communication between the electronic device 102A and the network 120. The electronic device 102A also comprises a graphic user interface (GUI) 106A coupled to the processor 104A, the GUI 106A being able to display text. In some embodiments, the GUI 106A is also able to display photos and/or video content. The electronic device 102A also comprises an input/output (I/O) interface 114A that enables one or more peripheral devices 116A to provide input to or receive output from the electronic device 102A. Examples of the peripheral devices 116A include, but are not limited to, speakers, monitors, high definition TVs (HDTVs), microphones, video cameras or "web cams", gaming controllers, scanners, and printers. The electronic device 102A may also comprise one or more antennas and a radio frequency transceiver (not shown) to promote radio communications, as is well known in the art.

As shown, the electronic device 102A also comprises a memory 110A coupled to the processor 104A, the memory 110A storing a user interface 112A. In some embodiments, the user interface 112A may be a standard Internet browser compatible with the electronic device 102A. Additionally or alternatively, the user interface 112A may be a specialized application suited to send requests to and receive instructions from the multipurpose online lobby application 140 being executed by the server 130. In either case, the user interface 112A enables a user of the electronic device 102A to interact with the multipurpose online lobby application 140 provided by the server 130 as will be described in greater detail.

As shown, the server 130 comprises a network interface 138 that couples to the network 120, enabling communication between the server 130 and the network 120. For example, the server 130 may receive requests from and send information to the electronic devices 102A-102N via the network 120. The server 130 also comprises a processor 132 that couples to the network interface 138 and to a memory 136 that stores the multipurpose online lobby application 140. The processor 132 is configured to execute instructions associated with the multipurpose online lobby application 140 to provide one or more multipurpose online lobbies accessible to the electronic devices 102A-102N. In some embodiments, the server 130 may support multiple applications, and the instructions associated with the multipurpose online lobby application 140 may execute in a time sharing manner in the processor 132, as is well known in the art. In at least some embodiments, the multipurpose online lobby application 140 includes lobby initialization instructions 142, lobby directory instructions 144, chat function instructions 146, other activities instructions 148, and device detection and adjustments instructions 150.

When executed (e.g., by the processor 132), the lobby initialization instructions 142 cause the processor 132 to generate an online lobby having at least some of the functionality described herein. For example, the lobby initialization instructions 142 may be executed in response to a request by a user of one of the electronic device 102A-102N. In some embodiments, the user of any of the electronic devices 102A-102N can request to start an online lobby according to the present disclosure. Also, the user can request that the online lobby be public or private. If the online lobby is private, the user specifies who can participate in the online lobby. For example, the requesting user can use a "buddy list" or other list to specify participants in a private lobby. In such case, only the users who were specified by the requesting user (either by name, company, or other criteria) can enter the lobby. In some embodiments, users specified to participate in a private online lobby receive an invitation or alert that indicates they have been invited to participate in the online lobby.

If the online lobby is public, the requesting user does not specify who can participate. After initialization, each public or private online lobby is accessible to the requesting user and to others who enter the lobby. When a user chooses to enter an online lobby, the server 130 updates the list of those participating in the online lobby and transmits data to the electronic devices of participating users. Each electronic device is able to present the online lobby provided by the server 130 in a format compatible with the electronic device's user interface. As previously mentioned, some electronic devices may present the online lobby in a simple format that displays only text and/or simple graphics, while other electronic devices present the online lobby in a more complex format that displays text, icons, photos, videos and/or other objects. Examples of online lobby interfaces are later described in greater detail in FIGS. 2A-2C.

When executed, the lobby directory instructions 144 may cause the processor 132 to organize initialized online lobbies into one or more directories. In some embodiments, a requesting user can select a particular directory in which to place an online lobby (e.g., based on topic, geographic location, school, company or other criteria). Additionally or alternatively, online lobbies can be organized based on whether the lobbies are public or private. If a directory desired by the requesting user does not already exist, the lobby directory instructions 144 may cause the processor 132 to create a new directory for the online lobby. Alternatively, the lobby directory instructions 144 can cause the processor 132 to assign an online lobby to a non-specific directory. By organizing initialized online lobbies into one or more directories, users are able to identify a lobby of interest and enter the lobby. If an online lobby terminates, the lobby directory instructions 144 may cause the processor 132 to remove the online lobby from a directory. If there are no other online lobbies in the directory, the lobby directory instructions 144 may either delete the directory or indicate that there are no online lobbies associated with the directory.

When executed, the chat function instructions 146 cause the processor 132 to present and update text in an initialized online lobby based on keystrokes received from one of the electronic devices 102A-102N. Additionally or alternatively, the chat function instructions 146 cause the processor 132 to present and update audio signals in an initialized online lobby based on signals received from, for example, a microphone associated with one of the electronic devices 102A-102N. In some embodiments, the chat function instructions 146 enable an initialized online lobby to display a participant's name and a visual representation (e.g., an icon, an avatar, a photo, or live video) during the chat based on the capabilities/hardware available to each participant's electronic device. For example, if a participant's electronic device has video camera or web cam capabilities, the chat function instructions 146 can enable the initialized online lobby to display live video of the participant.

When executed, the other activities instructions 148 cause the processor 132 to access other applications or instructions for use with an initialized online lobby. In some embodiments, the other activities instructions 148 cause the processor 132 to handle data requests and data transfers between the server 130 and the electronic devices 102A-102N to display the other activities in the initialized online lobby. Examples of activities that could be supported by the initialized online lobby include, but are not limited to, audio/video conferencing, audio sharing, photo sharing, video sharing, desktop/screen sharing, multiplayer gaming, and other interactive multi-user applications.

In at least some embodiments, the multipurpose online lobby application 140 supports the simultaneous use of devices of different types and capabilities. For example, mobile users that participate in an initialized online lobby may use regular cellular phones (with audio and text only) or smart phones (with still image and video capabilities). Meanwhile, users at home may use set top boxes and/or HDTV sets with built-in video cameras, or a desktop computer with a web cam. To simultaneously support these different devices, the multipurpose online lobby application 140 implements device detection and adjustments instructions 150.

When executed, the device detection and adjustments instructions 150 cause the processor 132 to identify electronic devices participating in an initialized online lobby. For example, when a user selects to enter an online lobby, the device detection and adjustments instructions 150 may request and receive information about the user's electronic device such as the electronic device's processing capabilities, peripherals available to the electronic device and/or the electronic device's network access capabilities. Based on the information provided by the user's electronic device, the device detection and adjustments instructions 150 may cause the server 130 to adjust (adapt) the information provided to the electronic device's user interface. Examples of parameters that could be adjusted include, but are not limited to, audio/video transcoding, data rate adaptation, video and image resizing, and video frame rate adaptation.

Figure 2A:
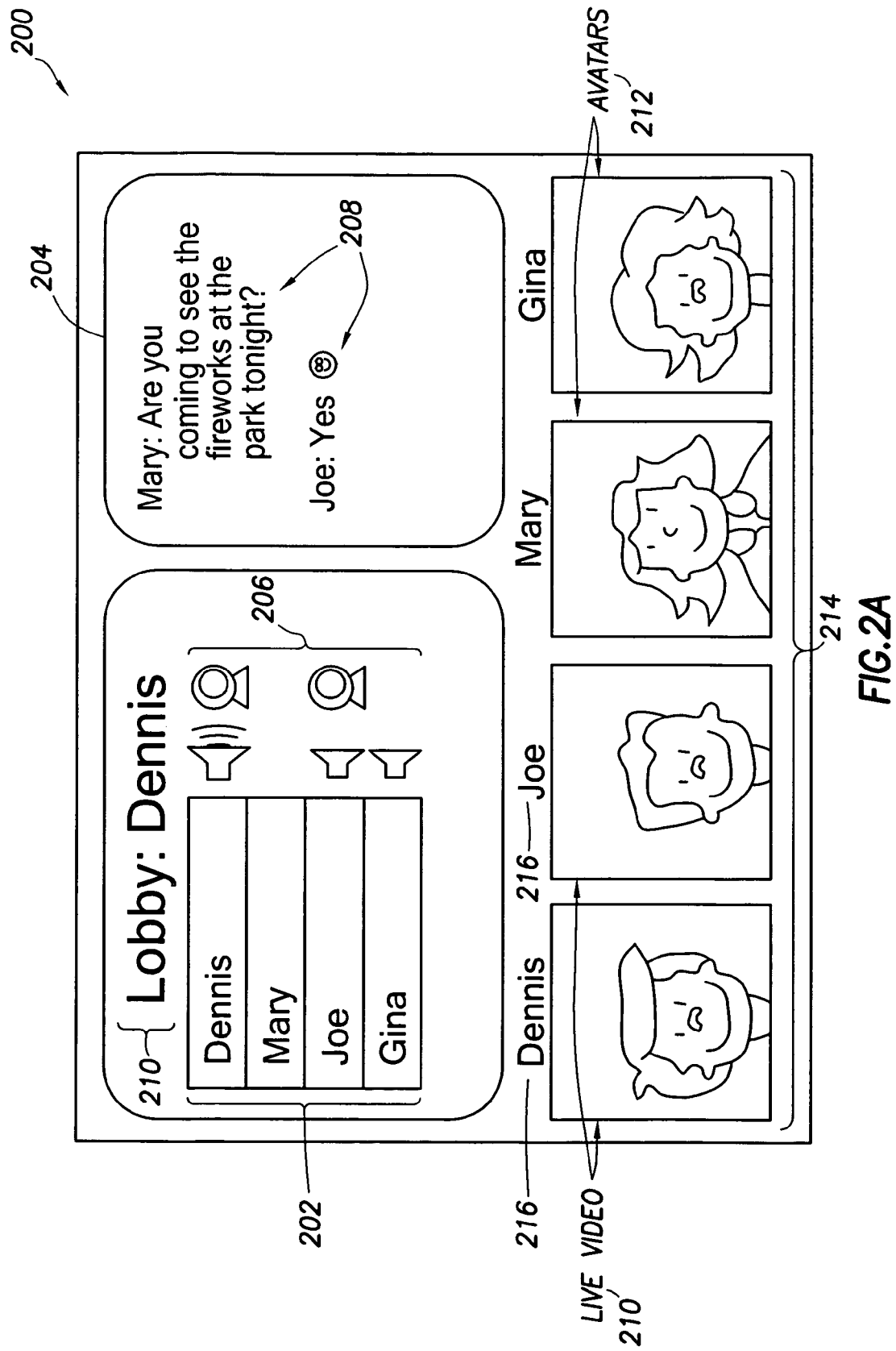
FIG. 2A illustrates a simplified screenshot of a multipurpose online lobby in accordance with embodiments of the disclosure.

FIG. 2A illustrates a simplified screenshot of a multipurpose online lobby 200 in accordance with embodiments of the disclosure. As shown in FIG. 2A, the multipurpose online lobby 200 presents a variety of information to users of the lobby 200. For example, in some embodiments, the multipurpose online lobby 200 indicates a name 210 associated with the lobby 200 (e.g., "Dennis") and provides a list 202 showing the users in the lobby 200. For example, "Dennis", "Margaret", "Joey", and "Gina" are shown in the list 202 of users in the lobby 200.

In some embodiments, the lobby 200 indicates the capabilities of the electronic devices associated with users in the lobby 200. For example, in FIG. 2A, the lobby 200 displays icons 206 that indicate the capabilities of the electronic devices associated with Dennis, Margaret, Joey, and Gina. Specifically, the icons 206 represent that Dennis' electronic device has speakers and a web cam, Margaret's electronic device has no speakers or web cam (i.e., text only), Joey's electronic device has speakers and a web cam, and Gina's electronic device has speakers, but no web cam. As shown, visual representations 214 of the participants can be displayed by the online lobby 200. For example, since Dennis' and Joey's electronic devices support web cams, the lobby 200 can display live video 210 of Dennis and Joey. Also, since Margaret's and Gina's electronic devices do not support web cams, the lobby 200 can display avatars 212 or other representations (e.g., photos or icons) for Margaret and Gina.

FIG. 2A also shows that text 216 (e.g., participant names) could be displayed near each visual representation 214 of participants in the lobby 200. In at least some embodiments, the text 216 can be updated based on selections made by participants and based on the activity being provided by the lobby 200.

In FIG. 2A, the lobby 200 also displays a chatting area 204. The chatting area 204 displays text 208 in real-time as participants in the lobby 200 chat using their respective electronic devices. As shown, the chatting area 204 displays a text question from Margaret and a text answer from Joey. As an example, Margaret could have entered the text question using a cellular phone key pad and Joey could have entered the text answer using a keyboard. As previously mentioned, the lobby 200 could support audio chatting, such as voice-conferencing in addition to or instead of text chatting. The lobby 200 could also support a variety of lobby services such as joining the lobby 200, leaving the lobby 200, conducting polls, muting one or more users of the lobby 200 or voting out (removing) a user of the lobby 200.

Figure 2B:
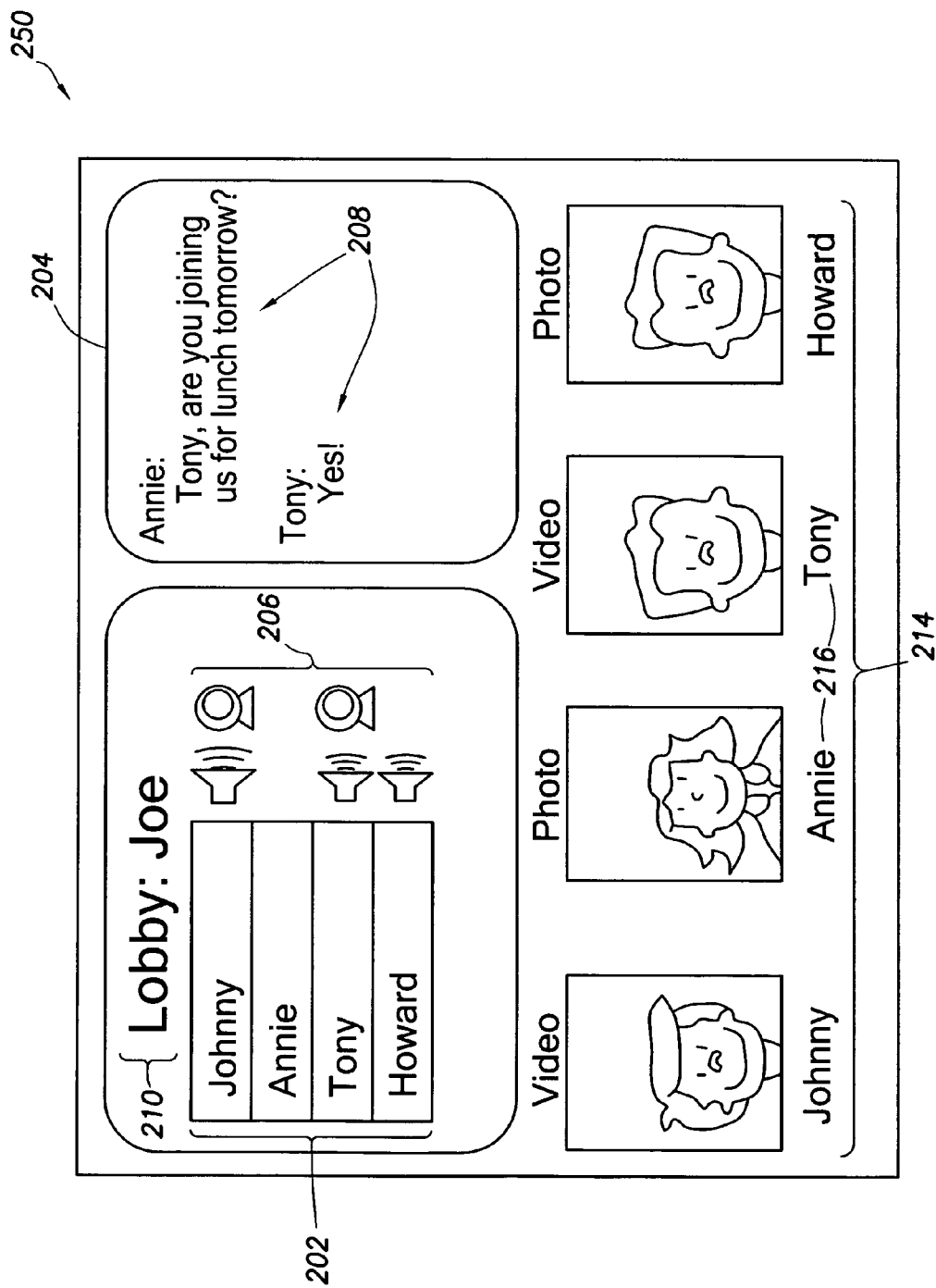
FIGS. 2B-2C illustrate simplified screenshots of another multipurpose online lobby in accordance with embodiments of the disclosure.
Figure 2C:
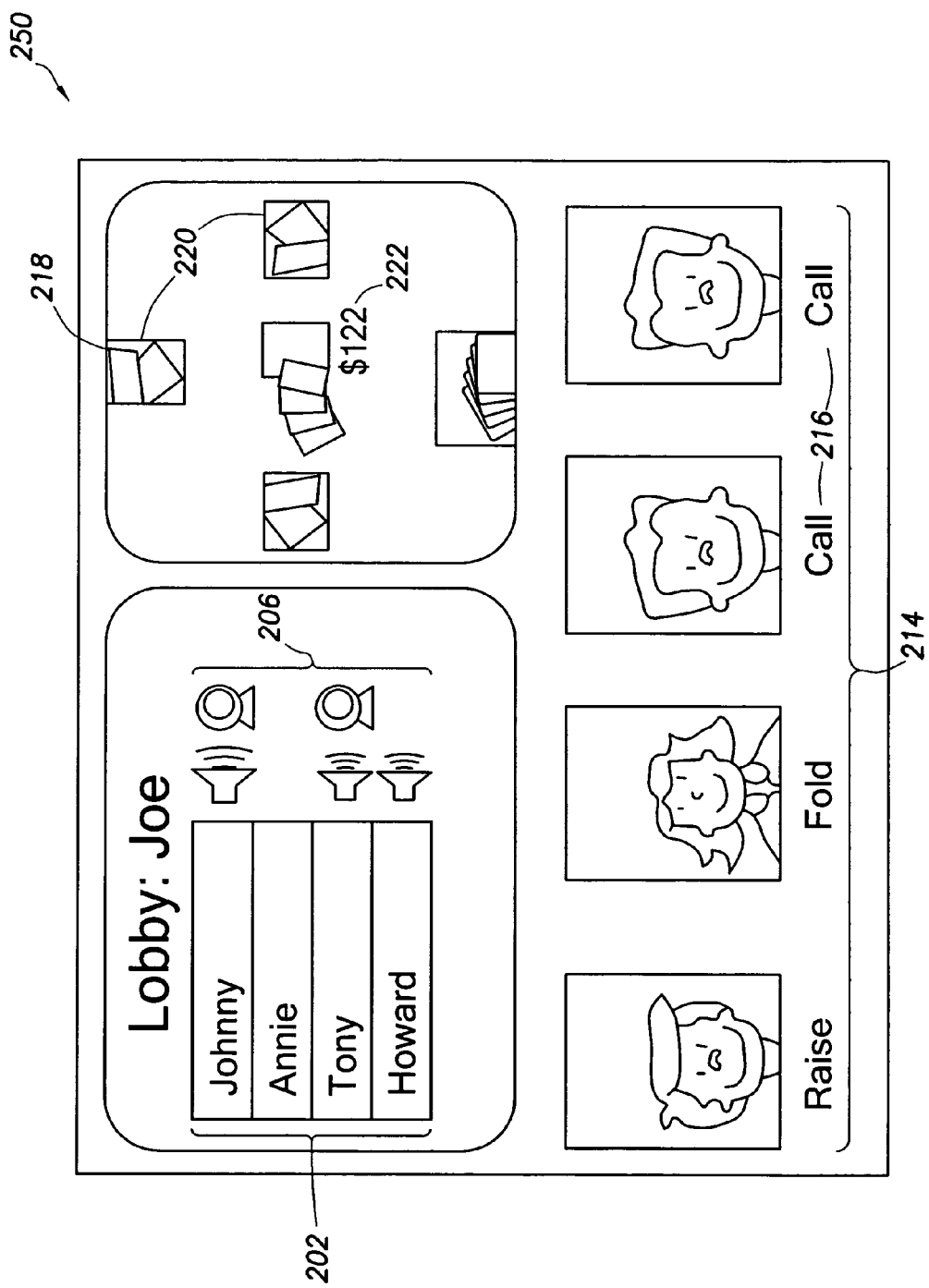

FIGS. 2B-2C illustrate simplified screenshots of another multipurpose online lobby 220 in accordance with embodiments of the disclosure. The lobby 220 in FIG. 2B is similar to the lobby 200 of FIG. 2A in that the multipurpose online lobby 220 indicates a name 210 associated with the lobby 220 (e.g., "Joe") and provides a list 202 showing the users in the lobby 220. FIG. 2B shows the lobby 220 being used for text chatting and FIG. 2C shows the same lobby 220 being used for a game of poker.

Similar to the lobby 200 of FIG. 2, the lobby 220 of FIG. 2B indicates the capabilities of the electronic devices associated with users in the lobby 220. As shown in FIG. 2B, the lobby 220 displays icons 206 that indicate the capabilities of the electronic devices associated with "Johnny", "Annie", "Tony", and "Howard". Specifically, the icons 206 represent that Johnny's electronic device has speakers and a web cam, Annie's electronic device has no speakers or web cam (i.e., text only), Tony's electronic device has speakers and a web cam, and Howard's electronic device has speakers, but no web cam. In FIG. 2B, visual representations 214 are provided for the users 202 in the lobby 220. For example, since Johnny's and Tony's electronic devices support web cams, the lobby 220 can display live video showing Johnny and Tony. Also, since Annie's and Howard's electronic devices do not support web cams, the lobby 220 can display photos 212 for Annie and Howard.

As shown in FIG. 2B, the lobby 220 displays a chatting area 204. The chatting area 204 displays text in real-time as users of the lobby 220 chat using their respective electronic devices. If the participants choose to engage in another activity supported by the multipurpose online lobby 220, the chatting area 204 shown in FIG. 2B could be replaced by another activity area. For example, FIG. 2C shows that, upon request, the lobby 220 could replace the chatting area 204 shown in FIG. 2B with a gaming area 218. In other words, the users of the lobby 220 have not changed, but the activity in which the participants engage has changed.

The gaming area 218 enables the users of the lobby 220 to play poker or some other game. As shown, the gaming area 218 could display cards 220 or a pot of money 222. In addition to displaying the visual representations 214 for the users 202 as previously mentioned, the lobby 220 also may display interactive responses (text) 216 of participants during the game. For example, during the poker game shown in FIG. 2C, Johnny is shown requesting to "raise", Annie is shown requesting to "fold", and both Tony and Howard are shown requesting to "call". In some embodiments, the interactive responses (text) 216 may be displayed in lieu of the names displayed by the graphical representation 214 for the users of the lobby 220. The text 216 displayed near the visual representations 214 of participants in the lobby 220 can be limited to certain words or characters depending on the activity selected by the users. In addition to or instead of updating text near the visual representation 214 of participants in the lobby 220, the lobby 220 could support audio communications between participants during the game.

In addition to text chatting or participating in a game, the users of the lobby 220 could participate in a variety of other activities such as audio sharing, video sharing, photo sharing, video conferencing, audio conferencing, application sharing, sharing a desktop or other interactive activities. Accordingly, when an activity supported by the lobby 220 is selected, a new activity area is presented to the users of the lobby 220. Each activity area would display information related to the activity and enable users of the lobby 220 to interact in a manner determined by the activity area. Also, each activity area could activate a particular set of words, messages, or characters for selection by participants in the lobby 220 during the activity. If selected by a participant, a word, message, or character could be displayed as text 216 (possibly replacing other text) near the visual representation 214 of the participant.

As previously described, the text chatting area 204 displays user names and text as users are text chatting. In FIG. 2A, the text 216 near each of the visual representations 214 simply displays the participants' names. As previously described, the gaming area 218 displays cards or other information related to the game being played. Although poker is shown in FIG. 2C, it should be understood that any multiplayer game supported by the online lobby 220 could be displayed in the gaming area 218.

As an example of the other activity areas, an audio sharing area may display audio file titles, song titles, artists, albums, or other information related to the audio being shared with participants. The audio being shared would be presented through the speakers of the participants' electronic devices. A video sharing area may display a video file title, a video title, an artist title, a movie title, or other information related to the video being shared. The video being shared would be presented though the GUIs, monitors, or HDTVs associated with the participants' electronic devices. The audio conferencing area may display names, topics, schedules, dates and times or other information related to an audio conference. The audio conference would be presented through the speakers of the participants' electronic devices. The video conferencing area may display names, topics, schedules, dates and times or other information related to a video conference. The video conference would be presented though the GUIs, monitors, or HDTVs associated with the participants' electronic devices. The application sharing area may display an application interface (e.g., a word processing application or spreadsheet application) being executed by the online lobby 220. The application sharing area could enable participants in the lobby 220 to provide input to the application through their respective electronic devices. Such a lobby 220 would enable collaboration on documents, projects, and the like, with each participant being able to interact with the document(s)/applications(s) in the work area 218. The input provided by the participants in the lobby 220 could be displayed in the application sharing area 218. The desktop sharing area may display a desktop of one of the participants' electronic devices. The desktop sharing area could enable participants in the lobby 220 to access files and directories provided on the desktop. Through their prospective electronic devices, participants in the lobby 220 could download or upload files using the desktop sharing area.

In at least some embodiments, the lobby 220 displays the chatting area 204 first, then displays other activities areas as users decide how to use the lobby 220 in other ways. Menus or other selections (not shown) for using the lobby 220 might be provided from which the participants might select. If the lobby 220 is displayed on mobile device GUIs, the amount of information that can be displayed is limited (e.g., either the chatting area 204 or the gaming area 218 is displayed, but not both). As shown in FIGS. 2B and 2C, the text near the visual representations 214 can be updated based on the activity selected by the users of the lobby 220. Also in FIGS. 2B and 2C, the list 202 of users and the icons 206 have not changed even though the selected activity in which the participants engage has changed. Thus, in some embodiments, the lobby 220 maintains some features (e.g., lobby name, identification of participants and/or electronic device capabilities) even though the activity area displays different activities. Whether activities are presented one at a time or simultaneously, the contents of an online lobby (e.g., text, photos, videos, gaming results) can be stored for future reference. Such a feature could be desirable in, for example, online work environments where information discussed in a lobby can be used as a reference for future discussions.

Figure 3:
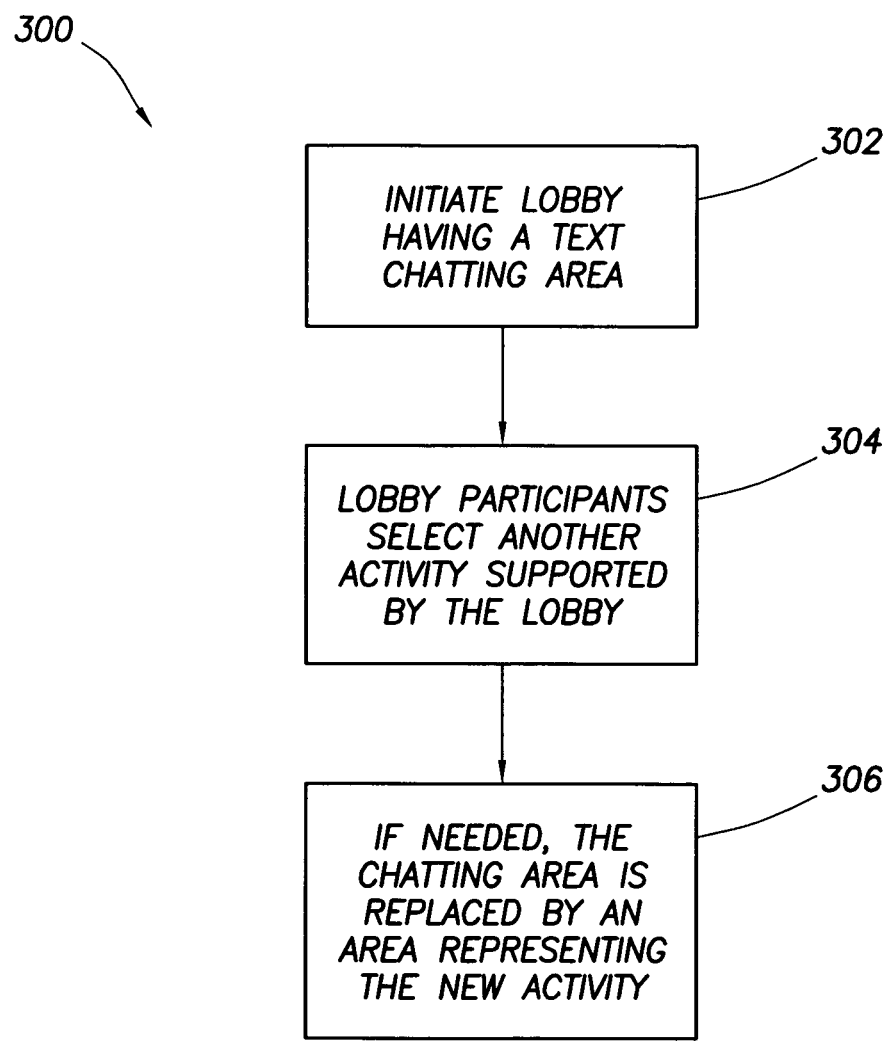
FIG. 3 illustrates a method in accordance with embodiments of the disclosure.

FIG. 3 illustrates a method 300 in accordance with one or more embodiments of the disclosure. As shown in FIG. 3, the method 300 comprises initiating a lobby having a chatting area (block 302). At block 304, one or more of the users of the lobby choose to participate in another activity supported by the lobby. For example, activities such as audio/video conferencing, audio sharing, photo sharing, video sharing, desktop/screen sharing, multiplayer gaming, application sharing, or other activities could be supported by the lobby. If necessary, for enabled users the chatting area is replaced or supplemented with an area representing the new activity selected by the users of the lobby (block 306). Even though the activity area may change based on what the users select, other portions of the lobby may remain the same. For example, a lobby may display a list of lobby participants regardless of the activity being displayed by the lobby. Also, the lobby may display visual representations of lobby participants regardless of the activity displayed. As previously mentioned, text near the visual representation could be updated during the activity. In such case, the text could be limited to certain words, messages or characters depending on the activity. Alternatively, this text could be anything a participant desires within a character length limit (e.g., 20 characters).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system comprising:
   a plurality of electronic devices, each of the electronic devices having a graphic user interface (GUI);
   a network configured to provide communication among the plurality of electronic devices; and
   a server in communication with the network, the server configured to execute an online lobby application, wherein, upon execution, the online lobby application:
   promotes presentation of the online lobby to the plurality of GUIs of the electronic devices,
   displays a first activity area that is selectively replaceable with a second activity area supported by the online lobby, wherein a second activity is different from a first activity of the first activity area,
   receives information from each of the plurality of electronic devices regarding one or more capabilities of its respective electronic devices while the online lobby application is executed, the capabilities comprising a processing capability of the electronic device hardware, and
   displays the capabilities of each of the plurality of electronic devices.

2. The system of claim 1 wherein the first activity area comprises a text chatting area.

3. The system of claim 1 wherein the second activity area is selected from the group of activity areas comprising an audio conferencing area, a video conferencing area, a photo sharing area, an audio sharing area, a video sharing area, a desktop sharing area, a multiplayer gaming area, and an application sharing area.

4. The system of claim 1 wherein the server is configured to respond to a request to initiate an online lobby received from any of the electronic devices.

5. The system of claim 1 wherein the online lobby is configured to continuously display selected information regardless of the activity presented by the first and second activity areas, the selected information being at least one type of information comprising a lobby name, lobby participants, capability icons of electronic devices associated with participants in the online lobby, and visual representations of participants in the online lobby.

6. The system of claim 1 wherein the online lobby is configured to simultaneously display a still image of a first participant in the online lobby and live video of a second participant in the online lobby.

7. The system of claim 1 wherein the online lobby is configured to display text near a visual representation of each of a plurality of participants in the online lobby.

8. The system of claim 7 wherein the text displayed near each of the visual representations is configured to be changed while the participants in the online lobby interact in an activity supported by the online lobby.

9. The system of claim 8 wherein the text displayed near each visual representation is configured to be limited based on the activity being displayed by the online lobby.

10. The system of claim 1 wherein the electronic devices are selected from the group of electronic devices comprising cellular phones, smart phones, laptop computers, personal digital assistants, and desktop computers.

11. The system of claim 1, wherein audio and video of participants of the plurality of electronic devices are configured to be provided to the lobby while engaged in a first activity in the first activity area and while engaged in a second activity in the second activity area.

12. The system of claim 1, wherein the capabilities comprise at least one of an audio capability, a video capability, and a still image capability, and
wherein the server is further configured to adjust parameters of the information provided to each electronic device's user interface based on the one or more capabilities, wherein the parameters include at least one of an audio/video transcoding, data rate adaptation, video and image resizing, and video frame rate adaptation.

13. A method comprising:
displaying an online lobby having a first activity in an area of the graphical user interface (GUI) of the online lobby;
receiving selections from a plurality of electronic devices selecting another activity for the online lobby;
replacing the first activity in the area of the GUI with a second activity in the area of the GUI of the online lobby, the second activity being different from the first activity, wherein a second activity is different from a first activity of the first activity area;
receiving information from each of the plurality of electronic devices regarding one or more capabilities of its respective electronic devices while the online lobby application is executed, the capabilities comprising a processing capability of the electronic device hardware; and
displaying the capabilities of each of the plurality of electronic devices.

14. The method of claim 13 further comprising displaying a portion of the online lobby that does not change if the first activity in the area of the GUI is replaced by the second activity in the area of the GUI.

15. The method of claim 13 further comprising displaying, in the online lobby, visual representations of a plurality of participants.

16. The method of claim 15 further comprising displaying, in the online lobby, text corresponding to at least one of the visual representations of the participants.

17. The method of claim 13, wherein the capabilities comprise at least one of an audio capability, a video capability, and a still image capability, and
wherein the method further comprises adjusting parameters of the information provided to each electronic device's user interface based the one or more capabilities, wherein the parameters include at least one of an audio/video transcoding, data rate adaptation, video and image resizing, and video frame rate adaptation.

18. A non-transitory storage medium that stores computer-readable instructions that, when executed, cause a computer to:
generate online lobbies in response to requests from a plurality of electronic devices;
organize a directory of online lobbies;
instruct the plurality of electronic devices to display, for each online lobby, a first activity in an area of a GUI that, upon request, is replaced by a second activity in the area of the GUI, wherein the second activity is different from the first activity;
receiving information from each of the plurality of electronic devices regarding one or more capabilities of its respective electronic device while the online lobby application is executed, the capabilities comprising a processing capability of the electronic device hardware; and
display the capabilities of each of the plurality of electronic devices for each online lobby.

19. The storage medium of claim 18, wherein the GUI includes a first area in which the first activity is displayed and a second area in which the second activity is displayed.

20. The storage medium of claim 18, wherein the first activity area is a text chatting area.

21. The storage medium of claim 18, wherein, when executed, the computer-readable instructions cause the computer to display as the second activity area at least one activity area selected from the group comprising an audio conferencing area, a video conferencing area, a photo sharing area, a music sharing area, a video sharing area, a desktop sharing area, a multiplayer gaming area, and an application sharing area.

22. The storage medium of claim 18, wherein audio and video for one or more of participants using the electronic devices is provided to the online lobby.

23. The storage medium of claim 18, wherein the capabilities comprise at least one of an audio capability, a video capability, and a still image capability, and
wherein when executed, the computer-readable instructions cause the computer to adjust arameters of the information provided to each electronic device's user interface based the one or more capabilities, wherein the parameters include at least one of an audio/video transcoding, data rate adaptation, video and image resizing, and video frame rate adaptation.

* * * * *